(12) United States Patent
Kwon

(10) Patent No.: US 9,832,772 B2
(45) Date of Patent: Nov. 28, 2017

(54) SYSTEM AND METHOD FOR PACKET INFORMATION INDICATION IN COMMUNICATION SYSTEMS

(71) Applicant: NEWRACOM, INC., Irvine, CA (US)

(72) Inventor: Young Hoon Kwon, Laguna Niguel, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/185,396

(22) Filed: Jun. 17, 2016

(65) Prior Publication Data

US 2016/0295587 A1  Oct. 6, 2016

Related U.S. Application Data

(63) Continuation of application No. 14/836,749, filed on Aug. 26, 2015, now Pat. No. 9,398,571.

(60) Provisional application No. 62/050,072, filed on Sep. 12, 2014.

(51) Int. Cl.
*H04W 72/04* (2009.01)
*H04W 84/12* (2009.01)
*H04B 7/0452* (2017.01)

(52) U.S. Cl.
CPC ....... *H04W 72/0446* (2013.01); *H04B 7/0452* (2013.01); *H04W 84/12* (2013.01)

(58) Field of Classification Search
None
See application file for complete search history.

(56) References Cited

U.S. PATENT DOCUMENTS

2011/0299468 A1  12/2011  Van Nee et al.
2013/0216002 A1  8/2013  Suh et al.
(Continued)

FOREIGN PATENT DOCUMENTS

WO  WO 2012/012567 A1  1/2012
WO  WO 2013/025923 A1  2/2013

OTHER PUBLICATIONS

Nguyen et al. "Uplink multi-user MAC protocol for 11ax", IEEE 11-14/0598r0, May 2014.*
(Continued)

*Primary Examiner* — Joseph Bednash

(57) ABSTRACT

A wireless device is described that may selectively include resource allocation information in a frame to be transmitted to one or more other wireless devices. The resource allocation may indicate channel/sub-channel assignment for each wireless device. The wireless devices may each utilize this received resource allocation information to determine the appropriate segment/sub-band of the transmission that is intended for their receipt/consumption. A first signaling field (e.g., HE-SIG-A) may indicate whether the resource allocation information is present in a second signaling field (e.g., HE-SIG-B) of the frame. For example, a single bit may be toggled to indicate the presence of the second signaling field and therefore the presence of the resource allocation information. Alternatively, multiple bits may be used to indicate the length of the second signaling field (e.g., a length of zero indicates the absence of the second signaling field and accordingly the absence of the resource allocation information).

20 Claims, 10 Drawing Sheets

(56) References Cited

U.S. PATENT DOCUMENTS

2014/0119327 A1    5/2014  Oh et al.
2016/0278081 A1*   9/2016  Chun .................... H04W 74/08

OTHER PUBLICATIONS

International Search Report and Written Opinion for PCT/US2015/047050, filed Aug. 26, 2015.
"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.
"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.
"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.
Young Hoon Kwon et al., "SIG Field Design Principle for 11ax", IEEE 802.11-15/0344r2, Mar. 9, 2015, pp. 1-18, Newracom.
Young Hoon Kwon et al., "SIG-B Field for HEW PPDU", IEEE 802.11-15/0805r2, Jul. 13, 2015, pp. 1-11, Newracom.
Robert Stacey, "Specification Framework for TGax", IEEE P802.11 Wireless LANs, IEEE 802.11-15/0132r8, Sep. 22, 2015, pp. 1-22, Intel.

* cited by examiner

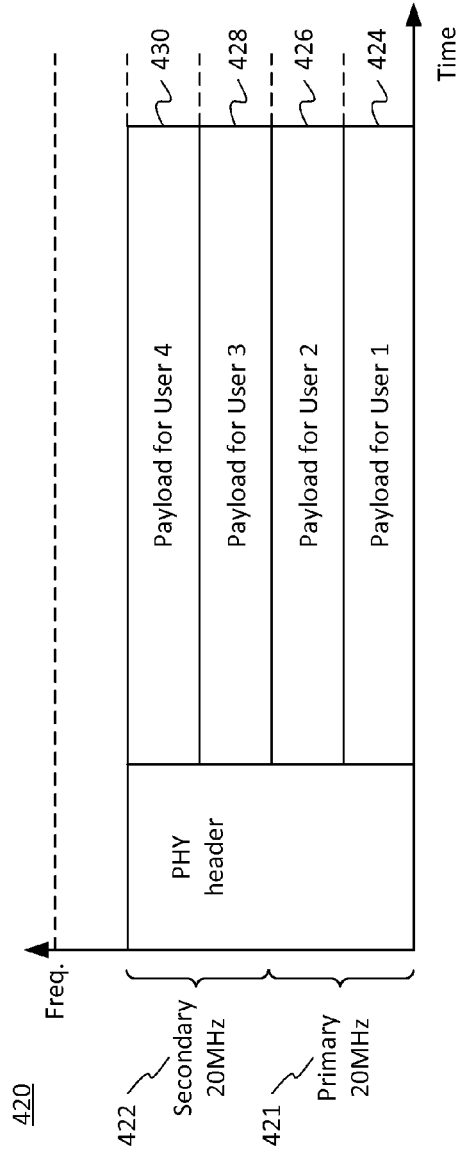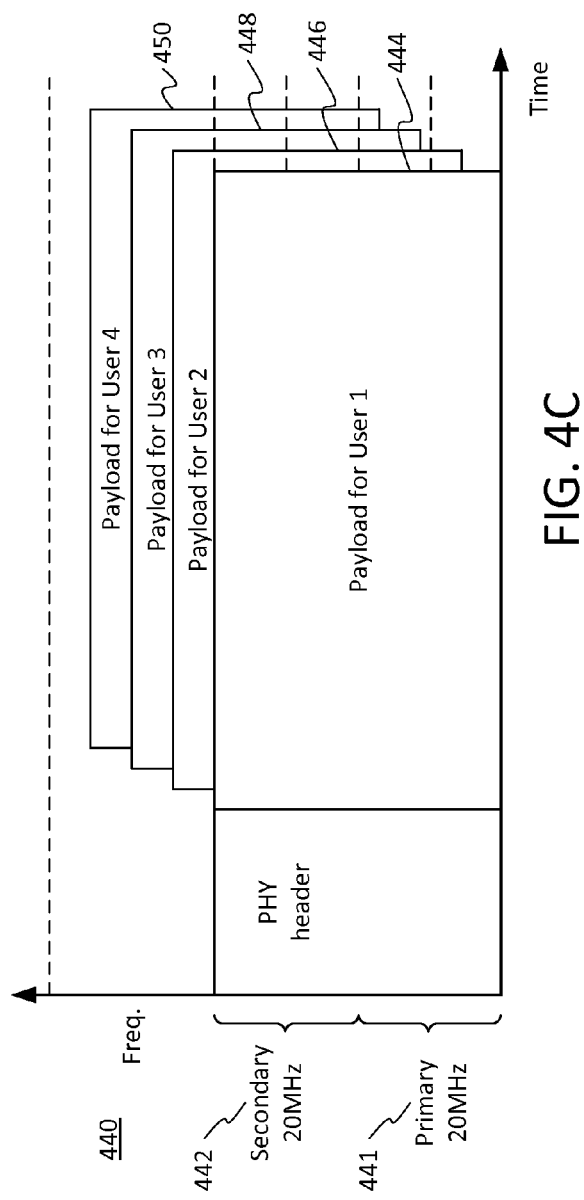

SYSTEM AND METHOD FOR PACKET INFORMATION INDICATION IN COMMUNICATION SYSTEMS

RELATED APPLICATION(S)

This application is a continuation of application Ser. No. 14/836,749, filed Aug. 26, 2015, which claims the benefit of U.S. Provisional Application No. 62/050,072, filed Sep. 12, 2014, each of which is hereby incorporated by reference in their entirety.

FIELD OF THE INVENTION

The present disclosure provides communication techniques for use in OFDMA and MU-MIMO type multi-user simultaneous transmission technologies, and with applicability to other wired or wireless multi-user simultaneous transmission technologies.

BACKGROUND

Today, wireless local area networks (WLANs) are widely used for communications between various computer devices and for Internet access. A prominent WLAN technology is known as WiFi, which allows electronic devices to network, using the 2.4 and 5 gigahertz bands. The term WiFi refers to any WLAN product that is based on the Institute of Electrical and Electronics Engineers (IEEE) 802.11 standards.

In 1999, IEEE 802.11a and 802.11b standards were released for WiFi networks. The 802.11a protocol can support data transmissions of up to 54 Mbps, whereas the 802.11b protocol has a longer range but maxing out at 11 Mbps data transmission speed.

In 2003, IEEE introduced 802.11g as a new WiFi standard. The 802.11g protocol was designed to operate at a maximum transfer rate of 54 Mbps while allowing for a longer range.

Subsequently, the adoption of 802.11n by IEEE, sometimes called Wireless-N, brought about the ability to transfer data up to 300 Mbps, and incorporated multiple wireless signals and antennas to support multiple-input and multiple-output (MIMO) technology. The 802.11n protocol allows data to be transmitted on both 2.4 GHz and 5 GHz frequencies.

The latest WiFi technology from IEEE, i.e. the 802.11ac standard, introduced advancements in dual-band technology, which allows data to be transmitted across multiple signals and bandwidths for maximum transmission rates of 1300 Mbps with extended range and nearly uninterrupted transmission.

As WiFi technology continues to advance, multi-user simultaneous transmission techniques, such as Orthogonal Frequency Division Multiple Access (OFDMA) and Uplink (UL) Multi-User MIMO (MU-MIMO), are candidates for improving wireless network efficiency. Using these techniques, multiple stations (STA) can be allocated within a frame. These STA allocations require a communication of resource and packet information by an access point (AP) for use by each STA.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure is directed to systems and methods for packet information indication in communication systems as shown and described herein. In particular, a wireless device may selectively include resource allocation/scheduling information in a frame to be transmitted to one or more other wireless devices. The resource allocation/scheduling may indicate channel/sub-channel assignment for each wireless device. The wireless devices may each utilize this received resource allocation/scheduling information to determine the appropriate segment/sub-band of the transmission that is intended for their receipt/consumption.

In one embodiment, a first signaling field (e.g., HE-SIG-A) may indicate whether the resource allocation/scheduling information is present in a second signaling field (e.g., HE-SIG-B) of the frame. For example, a single bit may be toggled to indicate the presence of the second signaling field and therefore the presence of the resource allocation/scheduling information in the frame. In one embodiment, multiple bits may be used to indicate the length of the second signaling field. In this embodiment, a length of zero indicates the absence of the second signaling field and accordingly the absence of the resource allocation/scheduling information.

In some instances the transmission of resource allocation/scheduling information may be avoided to reduce overhead and/or superfluous information. For example, in single user transmissions, resource allocation/scheduling information may be unnecessary as the channel will not be subdivided. In another example, resource allocation/scheduling information may not be needed for responses to a trigger frame (i.e., a frame that previously provided resource allocation/scheduling information) as the transmitter of the trigger frame is already aware of the resource allocation/scheduling information.

The aforementioned aspect of the present disclosure and other aspects are substantially shown in and/or are described in connection with at least one of the figures, as set forth more completely in the claims. The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary

BRIEF DESCRIPTION OF THE DRAWINGS

FIG. 4B presents an OFDMA type resource allocation diagram of a PHY frame;

FIG. 4C presents a MU-MIMO type resource allocation diagram of a PHY frame;

DETAILED DESCRIPTION

Figure 1:
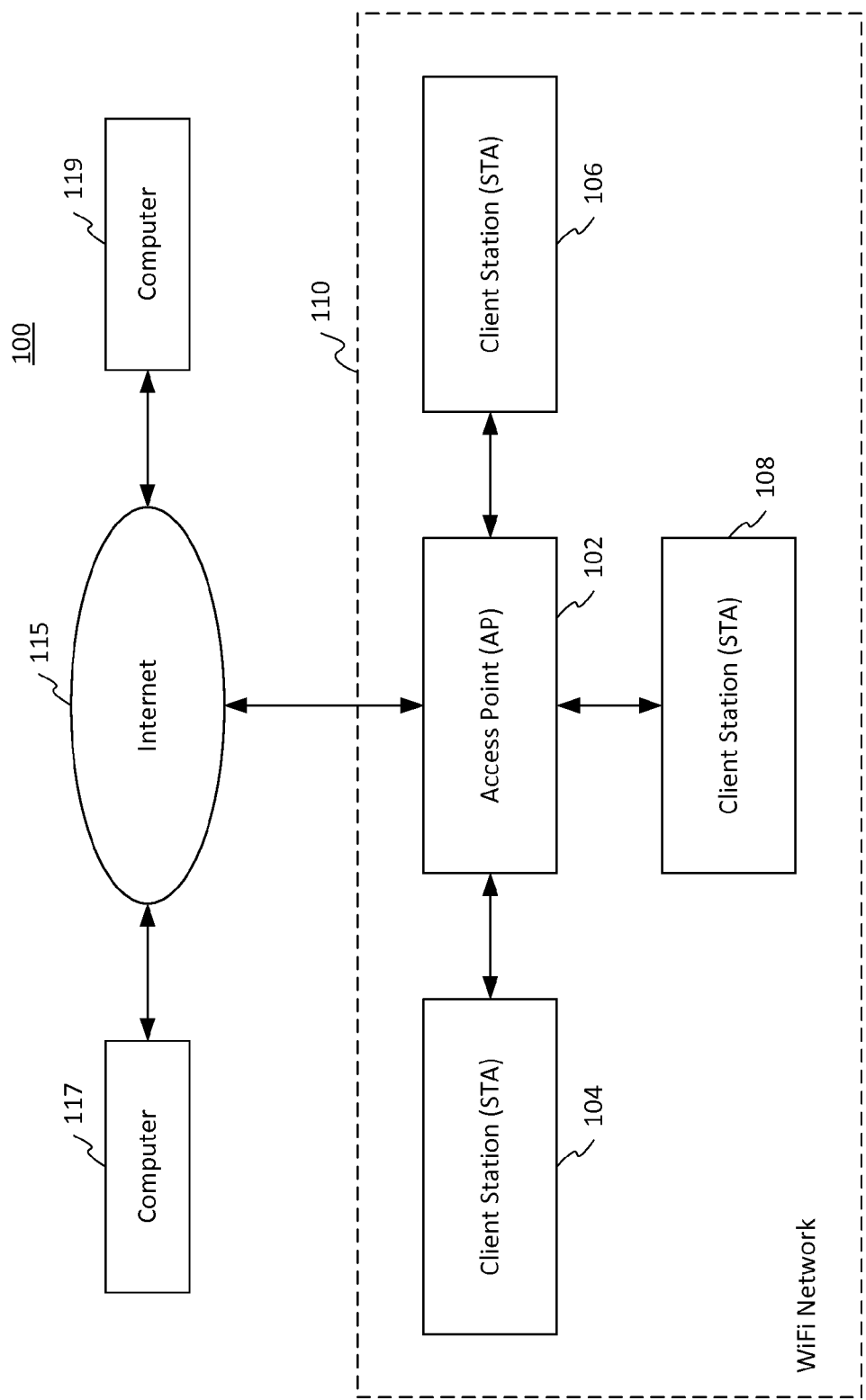
FIG. 1 illustrates a network, including a wireless area network (WLAN) having a plurality of stations in wireless communication with an access point.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates network 100 including wireless area network (WLAN) 110 having a plurality of stations (STA) 104/106/108 in wireless communication with access point (AP) 102. As shown in FIG. 1, AP 102 is also in communication with computers 117/119 over wide area network or Internet 115. WLAN 110 may be a WiFi network, which is established using any set of protocols, techniques, and standards, including protocols and techniques presented herein. In particular, each STA 104/106/108 is wirelessly connected to AP 102 and communicates with AP 102 using any set of protocols, techniques, and standards, including protocols and techniques presented herein. AP 102 is also connected to Internet 115 either through a wired connection, such as DSL or cable, or through a wireless connection, such as 3G or Long-Term Evolution (LTE). As such, each STA 104/106/108 may also communicate with computers 117/119 over Internet 115 through AP 102.

Figure 2:
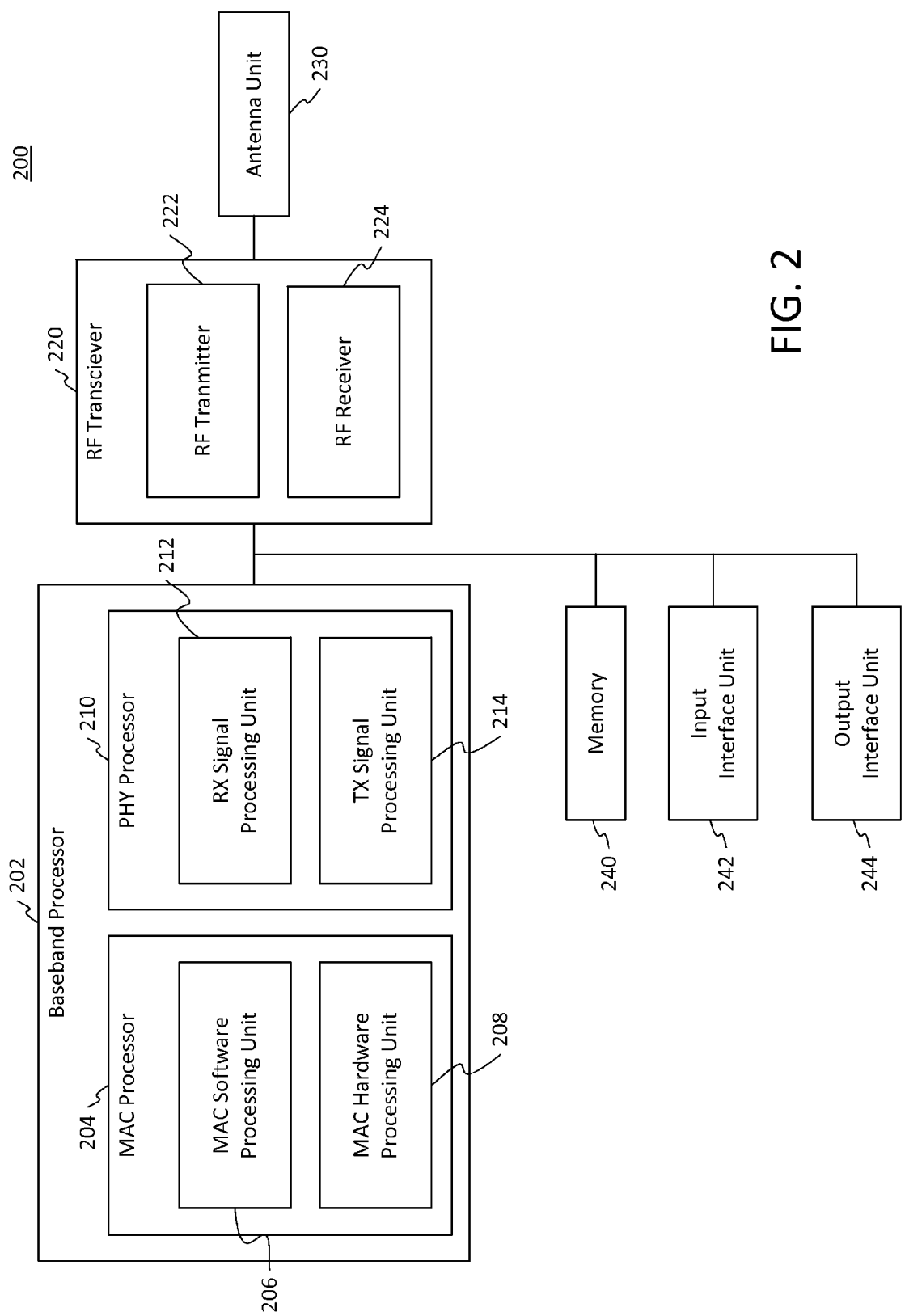
FIG. 2 presents components of a WLAN device for use in the WLAN of FIG. 1.

FIG. 2 presents components of WLAN device 200, which may be any of AP 102 and STAs 104/106/108, for use in WLAN 110 of FIG. 1. WLAN device 200 may include a medium access control (MAC) layer and a physical (PHY) layer, according to any set of protocols, techniques, and standards, including protocols and techniques presented herein. In one implementation, as shown in FIG. 1, at least one WLAN device may be operated as an access point device, such as AP 102, and the other WLAN devices may be non-AP stations, such as STAs 104/106/108. In other implementations, not shown in FIG. 1, all WLAN devices may be non-AP STAs in an ad-hoc networking environment. In general, the AP STA and the non-AP STAs may be collectively or individually referred to as stations or station, respectively.

With reference to FIG. 2, WLAN device 200 includes baseband processor 202, radio frequency (RF) transceiver 220, antenna unit 230, memory 240, input interface unit 242, and output interface unit 244. Baseband processor 202 performs baseband signal processing and includes MAC processor 204 and PHY processor 210.

In one implementation, MAC processor 204 may include MAC software processing unit 206 and MAC hardware processing unit 208. Memory 240 is a computer readable non-transitory storage device and may store software, such as MAC software, including at least some functions of the MAC layer. Memory 240 may further store an operating system and other software and applications for WLAN device 200. MAC software processing unit 206 executes the MAC software to implement various functions of the MAC layer, and MAC hardware processing unit 208 may implement other functions of the MAC layer in hardware.

In one implementation, PHY processor 210 includes receive (RX) signal processing unit 212, which is connected to RF receiver 224, and transmit (TX) signal processing unit 214, which is connected to RF transmitter 222.

TX signal processing unit 214 may include an encoder, an interleaver, a mapper, an inverse Fourier transformer (IFT), and a guard interval (GI) inserter. In operation, the encoder encodes input data, the interleaver interleaves the bits of each stream output from the encoder to change the order of bits, the mapper maps the sequence of bits output from the interleaver to constellation points, the IFT converts a block of the constellation points output from the mapper to a time domain block (i.e., a symbol) by using an inverse discrete Fourier transform (IDFT) or an inverse fast Fourier transform (IFFT), and the GI inserter prepends a GI to the symbol for transmission using RF transmitter 222 of RF transceiver 220. When MIMO or MU-MIMO is used, RF transmitter 222 and the GI inserter may be provided for each transmit chain, in addition to one or more other portions of TX signal processing unit 214.

RX signal processing unit 212 may include a decoder, a deinterleaver, a demapper, a Fourier transformer (FT), and a GI remover. In operation, the GI remover receives symbols from RX receiver 224 of RF transceiver 220. When MIMO or MU-MIMO is used, RF receiver 224 and the GI remover may be provided for each receive chain, in addition to one or more other portions of RX signal processing unit 212. The FT converts the symbol (i.e., the time domain block into a block of the constellation points by using a discrete Fourier transform (DFT) or a fast Fourier transform (FFT). The demapper demaps the constellation points output from the FT, the deinterleaver deinterleaves the bits of each stream output from the demapper, and the decoder decodes the streams output from the deinterleaver to generate input data for framing.

In one implementation, input interface unit 242 is configured to receive information from a user, and output interface unit 244 is configured to output information to the user. Antenna unit 230 may include one or more antennas for wireless transmission and reception of wireless signals. For example, for MIMO or MU-MIMO transmissions, antenna unit 230 may include a plurality of antennas.

Figure 3:
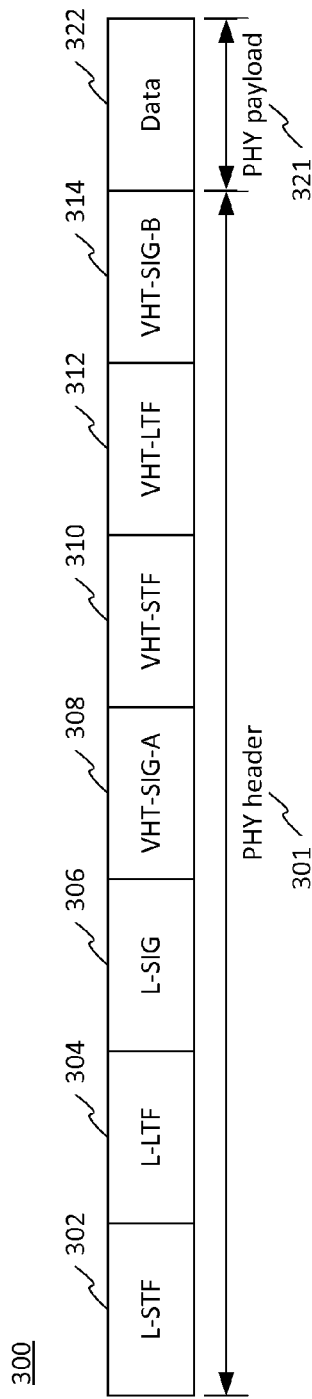
FIG. 3 presents a physical layer (PHY) frame for use by the WLAN of FIG. 1 when operating according to the 802.11ac standard.

Turning to FIG. 3, FIG. 3 presents physical layer (PHY) frame 300 for use by WLAN 110 of FIG. 1 when operating according to the IEEE 802.11ac standard. As shown in FIG. 3, PHY frame 300 includes PHY header 301 and PHY payload 321. PHY header 301 has a plurality of fields, including L-STF 302, L-LTF 304, L-SIG 306, VHT-SIG-A 308, VHT-STF 310, VHT-LTF 312, VHT-SIG-B 314, and PHY payload 321 includes data 322.

L-STF (Legacy Short Training Field) 302 and L-LTF (Legacy Long Training Field) each may be represented by two (2) OFDM symbols that are used to assist WiFi receivers in identifying that an IEEE 802.11 frame is about to start, synchronizing timers, and estimating wireless channels. L-SIG (Legacy Signal Field) 306 is used to describe the data rate and length of the frame in bytes, which is used by WiFi receivers to calculate the time duration of the frame's transmission. Any IEEE 802.11 device that is capable of OFDM operation can decode L-STF 302, L-LTF 304 and L-SIG 306. PHY header 301 starts with L-STF 302, L-LTF 304 and L-SIG 306, so that even legacy STAs that do not support the IEEE 802.11ac standard are able to detect at least legacy parts (L-STF, L-LTF, and L-SIG) of PHY header 301.

VHT-SIG-A (Very High Throughput Signal A) 308 and VHT-SIG-B (Very High Throughput Signal B) 314, taken together, describe the included frame attributes, such as the channel width, modulation and coding, PHY payload 321, and whether the frame is a single-user or multi-user frame. The purpose of VHT-SIG-A 308 and VHT-SIG-B 314 is to help the WiFi receiver decode the data payload, which is done by describing the parameters used for transmission. The IEEE 802.11ac standard separates the signal into two different parts, called VHT-SIG-A 308 and VHT-SIG-B 314. VHT-SIG-A 308 is in the part of PHY header 301 that is received identically by all receivers. VHT-SIG-B 314 is in the part of PHY header 301 that is different for each multi-user receiver in case of down-link (DL) MU-MIMO transmission. VHT-SIG-A 308 is duplicated for each 20 MHz band, so that STAs can identify PHY header 301 by only checking the primary 20 MHz band. It should be noted that in case of a single user transmission, there is only one target receiver and, as such, there is no separate VHT-SIG-B for another receiver.

VHT-SIG-A 308 comes first in PHY header 301 and may take on one of two forms depending on whether the transmission is single-user or multi-user. Because VHT-SIG-A 308 holds rate information for decoding PHY payload 321, VHT-SIG-A 308 is transmitted using a conservative modulation technique. VHT-SIG-B 314 may be used to set up the data rate, as well as tune in MIMO reception. Like VHT-SIG-A 308, VHT-SIG-B 314 is modulated conservatively to assist receivers in determining the data rate of PHY payload 321. For example, VHT-SIG-A 308 and VHT-SIG-B 314 may be encoded with the lowest Modulation and Coding Scheme (MCS) level. VHT-SIG-B 314 is designed to be transmitted in a single OFDM symbol. As such, VHT-SIG-B 314 has slightly different lengths depending on the channel width.

VHT-STF (Very High Throughput Short Training Field) 310 serves the same purpose as L-STF 302. Just as the first training fields help a receiver tune in the signal, VHT-STF 310 assists the receiver in detecting a repeating pattern and setting receiver gain. VHT-LTF (Very High Throughput Long Training Field) 312 consists of a sequence of symbols that set up demodulation of the rest of the frame and also the channel estimation process for beamforming. The number of VHT-LTF 312 symbols varies depending on the number of spatial streams carried on the payload.

Data 316 holds the higher-layer protocol packet or possibly an aggregate frame containing multiple higher-layer packets. PHY payload 321, which contains data payload 316, immediately follows PHY header 301. Data payload 316 is transmitted at the data rate described by PHY header 301.

Figure 4A:
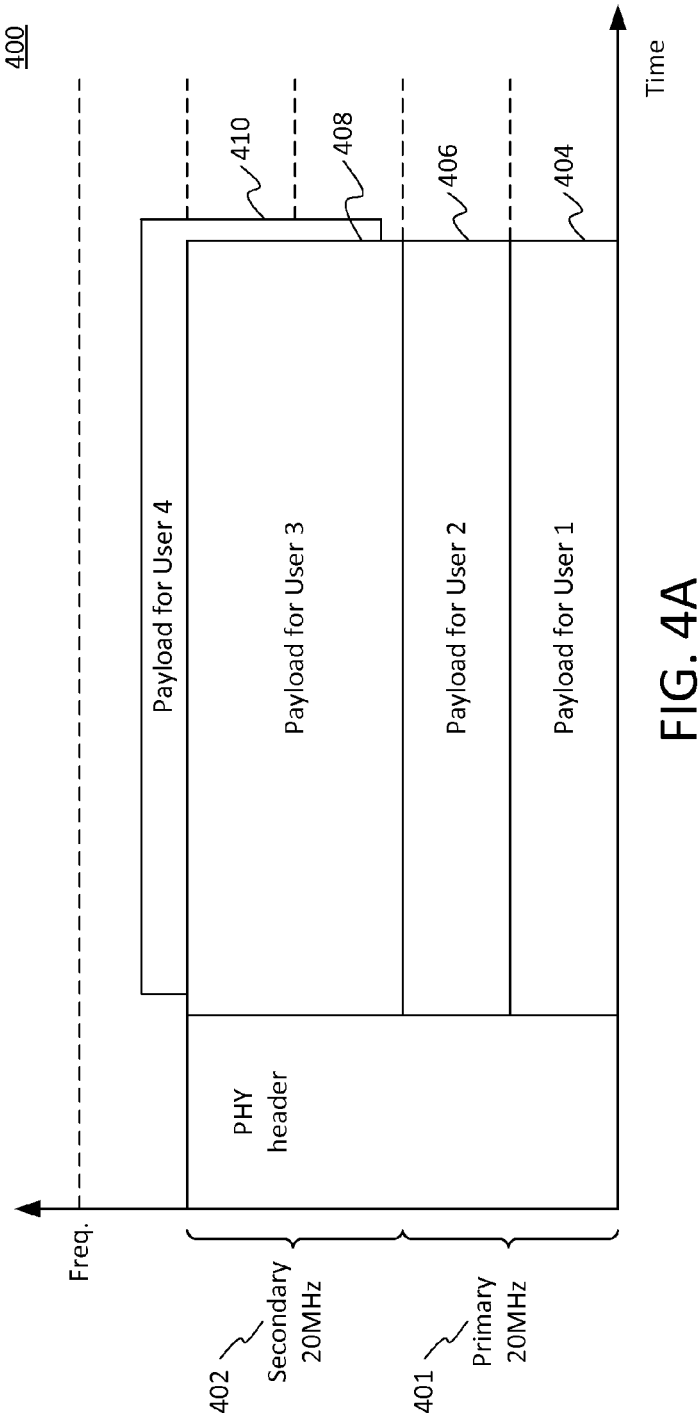
FIG. 4A presents an OFDMA and MU-MIMO type resource allocation diagram of a PHY frame.

Although PHY frame 300 may have some benefits, PHY frame 300 may not be appropriate for OFDMA type resource allocation, as described below. FIG. 4A presents an OFDMA and MU-MIMO type resource allocation diagram 400 for a PHY frame. As shown in FIG. 4A, four (4) different users are allocated within one frame duration. Payload for User 1 (404) and Payload for User 2 (406) are allocated in the primary 20 MHz band (401) in an OFDMA manner, which means Payload for User 1 (404) and Payload for User 2 (406) occupy different frequency resources within the primary 20 MHz band (401). Payload User 3 (408) and Payload User 4 (410) are allocated in the secondary 20 MHz band (402) in MU-MIMO manner, which means Payload User 3 (408) and Payload User 4 (410) occupy the same time and frequency resource, but are separated in the spatial domain using multiple antenna techniques. In the example of FIG. 4A, the PHY payload for each of the four users occupies a different resource, either in a different frequency or spatially separated, but shares at least a portion of the same PHY header. In particular, for uplink transmissions, where multiple different STAs transmit to the same AP, all STAs transmit the same information in at least a portion of the same PHY header, such that the AP can decode the PHY header correctly, since the portion of the PHY header is shared by all STAs.

FIG. 4B presents an OFDMA type resource allocation diagram 420 for a PHY frame. As shown in FIG. 4B, four (4) different users are allocated within one frame duration. Payload for User 1 (424) and Payload for User 2 (426) are allocated in the primary 20 MHz band (421) in an OFDMA manner, which means Payload for User 1 (424) and Payload for User 2 (426) occupy different frequency resources within the primary 20 MHz band (421). Payload User 3 (428) and Payload User 4 (430) are allocated in the secondary 20 MHz band (422), also in an OFDMA manner, which means Payload User 3 (428) and Payload User 4 (430) occupy different frequency resources within the secondary 20 MHz band (422).

FIG. 4C presents an MU-MIMO type resource allocation diagram 440 for a PHY frame. As shown in FIG. 4C, four (4) different users are allocated within one frame duration. In particular, Payload User 1 (444), Payload User 2 (446), Payload User 3 (448), and Payload User 4 (450) are all allocated in both the primary 20 MHz band (441) and the secondary 20 MHz band (442) in an MU-MIMO manner (i.e., Payload User 1 (444), Payload User 2 (446), Payload User 3 (448), and Payload User 4 (450) occupy the same time and frequency resource, but are separated in spatial domain using multiple antenna techniques). Although shown in relation to a 40 MHz channel (i.e., the combined primary 20 MHz band (441) and secondary 20 MHz band (442)), this MU-MIMO technique may be performed in relation to any size channel (e.g., 20 MHz, 80 MHz, etc.).

Since signals from multiple STAs 104/106/108 are to be received simultaneously at AP 102, each STA's 104/106/108 transmission timing has to be synchronized. Also, signals from multiple STAs 104/106/108 need to be sent within the scheduled resource to avoid packet collision between the STAs 104/106/108. Even though different STAs 104/106/108 use non-overlapping resources, at least part of the PHY header of each STA 104/106/108 may be sent using the same or an overlapping resource, such as legacy fields of L-STF, L-LTF and L-SIG. As such, the portion of the PHY header sent using the overlapping resource must be the same for all STAs 104/106/108, such that the combined signal can be decoded at AP 102. To this end, AP 102 sends a scheduling information frame (e.g., a trigger frame) to all STAs 104/106/108 prior to simultaneous transmissions by the STAs 104/106/108. The scheduling information frame may satisfy multiple purposes by setting a reference time for synchronization, providing information on resource allocation, and providing information as to how to encode the portion of the PHY header transmitted using the overlapping resource.

Since AP 102 provides STAs 104/106/108 with scheduling or resource allocation information before STAs' 104/106/108 uplink (UL) transmissions, the resource allocation information in the PHY header portion of STA's 104/106/108 UL transmission is redundant and serves no purpose as AP 102 already knows the resource allocation information that AP 102 originally transmitted to the STAs 104/106/108. In fact, STAs 104/106/108 may not use a different resource allocation than the one indicated by AP 102, since that can cause collisions with UL transmissions from other STAs 104/106/108. As such, STAs 104/106/108 must follow the exact resource allocation provided by AP 102.

Therefore, using PHY frame 300 will result in each STA's UL transmission to include the same resource allocation portion that is received from AP 102 and which is already known by STA 104/106/108. Thus, as noted above, including the resource allocation information in the PHY header of each STA's 104/106/108 UL transmission will increase signaling overhead and is redundant. In one implementation of the present disclosure, the PHY header includes at least two signaling (SIG) fields, which are encoded separately. The first encoded SIG field includes a resource allocation indication (RAI) to indicate whether or not the other encoded SIG field(s) includes resource allocation information. STA 104/106/108 does not include the resource allocation information in the PHY header if a receiver of a frame, e.g. AP 102, has access to the resource allocation information, such as UL OFDMA and single user full band transmissions. However, STA 104/106/108 includes the resource allocation information in the PHY header if the receiver of the frame does not have access to the resource allocation information, such as DL OFDMA or single user partial band transmissions. For example, in case of UL MU simultaneous transmission, every STA that participates in the transmission needs to set the RAI in the first encoded signaling (SIG) field to indicate that resource allocation information is not included in the other encoded SIG field(s). In another implementation, the PHY header includes a single SIG field, such that the other encoded SIG fields are completely omitted if the receiver of the frame has access to all information that would be included within these omitted SIG field(s).

Figure 5:
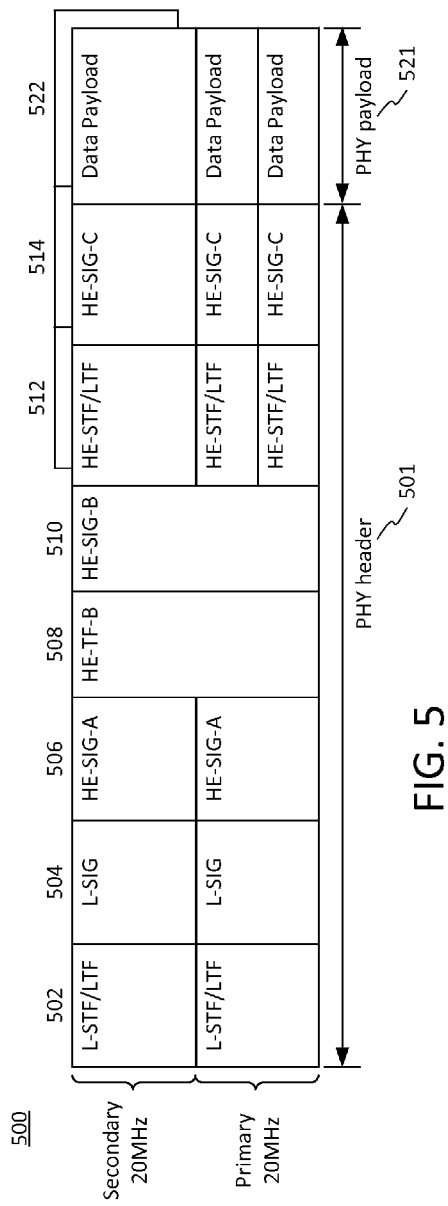
FIG. 5 presents a PHY frame having a PHY header with four (4) possible SIG fields and a HE-TF-B field, according to one implementation of the present disclosure.

FIG. 5 presents PHY frame 500 having PHY header 501 with four (4) possible SIG fields 504/506/510/514 and HE-TF-B field 508, according to one implementation of the present disclosure. As shown in FIG. 5, SIG fields include L-SIG 504, HE-SIG-A 506, HE-SIG-B 510 and HE-SIG-C 514, where HE stands for high efficiency. In the implementation of FIG. 5, HE-SIG-A 506 includes an indication to indicate to a receiver whether HE-SIG-B 510 is included in PHY header 501 or not, where HE-SIG-B 510 includes resource allocation information. As such, HE-SIG-B 510 is included in PHY header 501 only when HE-SIG-A 506 indicates that HE-SIG-B 510 exists in PHY header 501. As shown in FIG. 5, PHY header 501 also includes L-STF/L-LTF 502 and L-SIG 504, which may be the same as L-STF 302, L-LTF 304 and L-SIG 306, respectively, in PHY header 301 of FIG. 3.

In the implementation of FIG. 5, HE-SIG-A 506 may include information relating to proper channel deferral and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 506 may also include an indication as to whether HE-SIG-B 510 exists in PHY header 501. In one implementation, HE-SIG-B 510 may have a variable size and HE-SIG-A 506 may indicate a length of HE-SIG-B 510. For example, if HE-SIG-A 506 indicates that the length of HE-SIG-B 510 is zero, PHY header 501 will not include HE-SIG-B 510 (i.e., this length serves as the indication that HE-SIG-B 510 is not present in the frame). However, if HE-SIG-A 506 indicates that the length of HE-SIG-B 510 is a number other than zero (e.g., greater than zero), PHY header 501 will include HE-SIG-B 510 having a length indicated by the number provided in HE-SIG-A 506. In another implementation, HE-SIG-B 510 may have a fixed, pre-established length and a single bit in HE-SIG-A 506 may indicate whether or not PHY header 501 includes HE-SIG-B 510.

HE-SIG-A 506 may be encoded in a predetermined channel bandwidth, e.g. 20 MHz, and may be duplicated at every predetermined channel bandwidth that the frame occupies. Also, channel estimation and decoding of HE-SIG-A 506 may rely on L-STF/L-LTF 502. HE-SIG-B 510 may include the resource allocation information for each scheduled STA, which may include mapping information between allocated sub-channel and corresponding STA. HE-SIG-B 510 may be encoded using an entire bandwidth that is indicated in HE-SIG-A 506. In some embodiments, HE-SIG-B may be repeated across separate sub-bands of the entire bandwidth. For example, duplicated copies of HE-SIG-B may be repeated in 20 MHz segments of the full channel bandwidth. In another example, HE-SIG-B may be partially copied in a set of sub-bands. For example, a first 20 MHz sub-band may include a first HE-SIG-B, a second 20 MHz sub-band may include a second HE-SIG-B, a third 20 MHz sub-band may include the first HE-SIG-B, a fourth 20 MHz sub-band may include the second HE-SIG-B, etc.

For proper decoding of HE-SIG-B 510, PHY header 501 includes HE-TF-B 508, which refers to STF/LTF for HE-SIG-B, and appears before HE-SIG-B 510, as shown in FIG. 5. In the event that PHY header 501 does not include HE-SIG-B 510, as indicated by HE-SIG-A 506, HE-TF-B 508 will also not be included in PHY header 501.

HE-SIG-C 514 may include per-STA frame information, such as MCS level, coding scheme, and use of Space-time block coding (STBC). In one implementation, HE-SIG-C 514 may be encoded per each allocated sub-channel, and may utilize HE-STF/LTF 502 for channel estimation and decoding.

Figure 6:
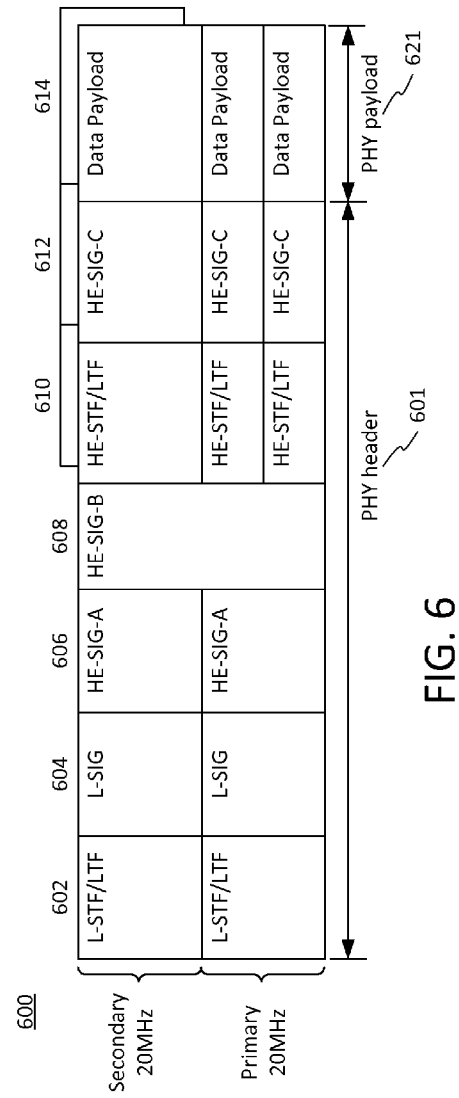
FIG. 6 presents a PHY frame having a PHY header with four (4) possible SIG fields, according to one implementation of the present disclosure.

FIG. 6 presents PHY frame 600 having PHY header 601 with four (4) possible SIG fields 604/606/608/612, according to one implementation of the present disclosure. As shown in FIG. 6, SIG fields include L-SIG 604, HE-SIG-A 606, HE-SIG-B 608, and HE-SIG-C 612. In the implementation of FIG. 6, HE-SIG-A 606 includes an indication to a receiver whether HE-SIG-B 608 is included in PHY header 601 or not, where HE-SIG-B 608 includes resource allocation information. As such, HE-SIG-B 608 is included in PHY header 601 only when HE-SIG-A 606 indicates that HE-SIG-B 608 exists in PHY header 601. As shown in FIG. 6, PHY header 601 also includes L-STF/L-LTF 602 and L-SIG 604, which are the same as L-STF 302, L-LTF 304, and L-SIG 306 in PHY header 301 of FIG. 3.

In the implementation of FIG. 6, HE-SIG-A 606 may include information relating to proper channel deferral, and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 606 may also include an indication as to whether HE-SIG-B 608 exists in PHY header 601. In one implementation, HE-SIG-B 608 may have a variable size and HE-SIG-A 606 may indicate a length of HE-SIG-B 608. For example, if HE-SIG-A 606 indicates that the length of HE-SIG-B 608 is zero, HE-SIG-B 608 will not be included in PHY header 601. However, if HE-SIG-A 606 indicates that the length of HE-SIG-B 608 is a number other than zero, PHY header 601 will include HE-SIG-B 608 of the length indicated by the number in HE-SIG-A 606. In another implementation, HE-SIG-B 608 may have a fixed, pre-established length and a single bit in HE-SIG-A 606 may indicate whether or not PHY header 601 includes HE-SIG-B 608.

HE-SIG-A 606 is encoded in a predetermined channel bandwidth, e.g. 20 MHz, and is duplicated at every predetermined channel bandwidth that the frame occupies. Also, channel estimation and decoding of HE-SIG-A 606 may rely on L-STF/L-LTF 602. HE-SIG-B 608 has the resource allocation information for each scheduled STA, which may include mapping information between allocated sub-channel and a corresponding STA. HE-SIG-B 608 may be encoded using an entire bandwidth that is indicated in HE-SIG-A 606 or may be encoded across multiple sub-bands of the channel in duplicated, non-duplicated, or partially duplicated parts as noted above. Unlike the implementation of FIG. 5, PHY header 601 of FIG. 6 does not include a HE-TF-B field and, thus, there is less overhead in PHY header 601 compared to PHY header 501. In the implementation of FIG. 6, for proper decoding of HE-SIG-B 608 with the absence of a HE-TF-B field, the receiver buffers the entire channel bandwidth of the received L-LTF 602 and after identifying the bandwidth of the frame, the receiver reutilizes L-LTF 602 information for the whole occupied bandwidth for decoding HE-SIG-B 608.

HE-SIG-C 612 may include per-STA frame information, such as MCS level, coding scheme, and/or use of STBC. In one implementation, HE-SIG-C 612 may be encoded per each allocated sub-channel and may utilize HE-STF/LTF 610 for channel estimation and decoding.

Figure 7A:
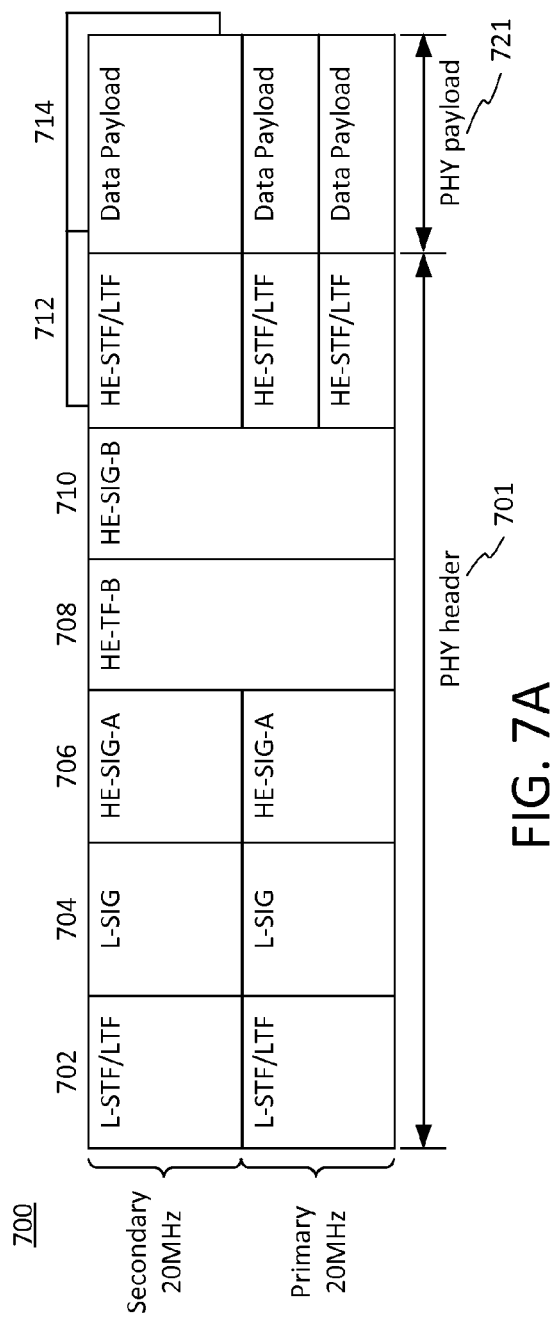
FIG. 7A presents a PHY frame having a PHY header with three (3) SIG fields and a HE-TF-B field, according to one implementation of the present disclosure.

FIG. 7A presents PHY frame 700 having PHY header 701 with three (3) SIG fields 704/706/710 and HE-TF-B 708 field, according to one implementation of the present disclosure. As shown in FIG. 7A, SIG fields include L-SIG 704, HE-SIG-A 706, and HE-SIG-B 710. In the implementation of FIG. 7A, HE-SIG-A 706 includes an indication to a receiver whether or not HE-SIG-B 710 includes resource allocation information. As such, resource allocation information is included in HE-SIG-B 710 only when HE-SIG-A 706 indicates that HE-SIG-B 710 includes such information. As shown in FIG. 7A, PHY header 701 also includes L-STF/L-LTF 702 and L-SIG 704, which are the same as L-STF 302, L-LTF 304 and L-SIG 306 in PHY header 301 of FIG. 3.

In the implementation of FIG. 7A, HE-SIG-A 706 may include information relating to proper channel deferral, and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 706 may also include an indication if HE-SIG-B 710 is present in the PHY header 700 or includes resource allocation information.

HE-SIG-A 706 may be encoded in a predetermined channel bandwidth, e.g. 20 MHz, and may be duplicated at every predetermined channel bandwidth that the frame occupies. Also, channel estimation and decoding of HE-SIG-A 706 may rely on L-STF/L-LTF 702. HE-SIG-B 710 may include per-STA frame information, such as MCS level, coding scheme, and/or use of STBC. If HE-SIG-A 706 indicates that HE-SIG-B 710 includes resource allocation information, HE-SIG-B 710 field will have resource allocation information for each scheduled STA, which may include mapping information between allocated sub-channel and a corresponding STA. HE-SIG-B 710 may be encoded using an entire bandwidth that is indicated in HE-SIG-A 706 or may be encoded across multiple sub-bands of the channel in duplicated, non-duplicated, or partially duplicated parts as noted above. For proper decoding of HE-SIG-B 710, PHY header 701 may include HE-TF-B 708, which appears before HE-SIG-B 710, as shown in FIG. 7A.

As shown in FIG. 7A, PHY header 701 may also include L-STF/L-LTF 702 and L-SIG 704, which are the same as L-STF 302, L-LTF 304 and L-SIG 306 in PHY header 301 of FIG. 3. HE-SIG-A 706 may include information relating to proper channel deferral and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 706 may also include an indication if HE-SIG-B 710 is included in PHY header 701. In one implementation, HE-SIG-B 710 may have a variable size and HE-SIG-A 706 may indicate a length of HE-SIG-B 710. For example, if HE-SIG-A 706 indicates that the length of HE-SIG-B 710 is zero, PHY header 701 will not include HE-SIG-B 710. However, if HE-SIG-A 706 indicates that the length of HE-SIG-B 710 is a number other than zero, PHY header 701 will include HE-SIG-B 710 of the length indicated.

HE-SIG-A 706 may be encoded in a predetermined channel bandwidth, e.g. 20 MHz, and may be duplicated at every predetermined channel bandwidth that the frame occupies. Also, channel estimation and decoding of HE-SIG-A 706 may rely on L-STF/L-LTF 702. HE-SIG-B 710 may include per-STA frame information, such as MCS level, coding scheme, and/or use of STBC. HE-SIG-B 710 may have resource allocation information for each scheduled STA, which may include mapping information between allocated sub-channel and corresponding STA. HE-SIG-B 710 may be encoded using an entire bandwidth that is indicated in HE-SIG-A 706 or may be encoded across multiple sub-bands of the channel in duplicated, non-duplicated, or partially duplicated parts as noted above. For proper decoding of HE-SIG-B 710, PHY header 701 includes HE-TF-B 708, which appears before HE-SIG-B 710, as shown in FIG. 7A. In the event that PHY header 701 does not include HE-SIG-B 710, as indicated by HE-SIG-A 706, HE-TF-B 708 will also not be included in PHY header 701.

Figure 7B:
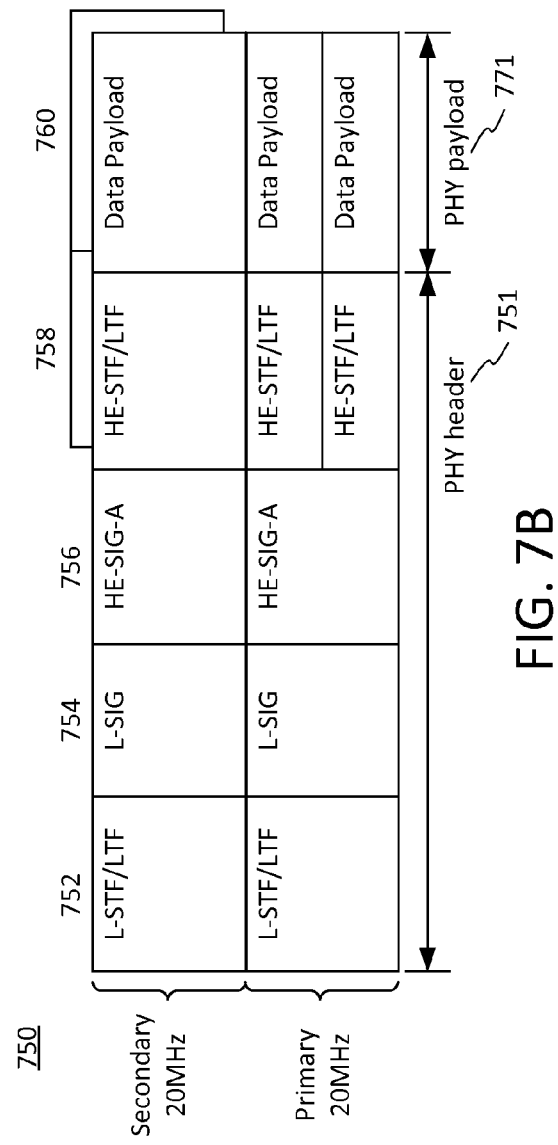
FIG. 7B presents a PHY frame having a PHY header with two (2) SIG fields, according to one implementation of the present disclosure.

FIG. 7B presents PHY frame 750 having PHY header 751 according to one implementation of the present disclosure, where HE-SIG-A 756 may include an indication to a receiver that a HE-SIG-B field is not included in PHY header 751. As such, resource allocation information is included only when HE-SIG-A 756 (or HE-SIG-A 706 of FIG. 7A) indicates that the HE-SIG-B is included in PHY header 751 (or 701). In FIG. 7B, L-STF/L-LTF 752, L-SIG 754, HE-SIG-A 756, HE-STF/LTF 758 and Data Payload 760 may correspond to L-STF/L-LTF 702, L-SIG 704, HE-SIG-A 706, HE-STF/LTF 712 and Data Payload 714 of FIG. 7A, respectively.

Figure 8:
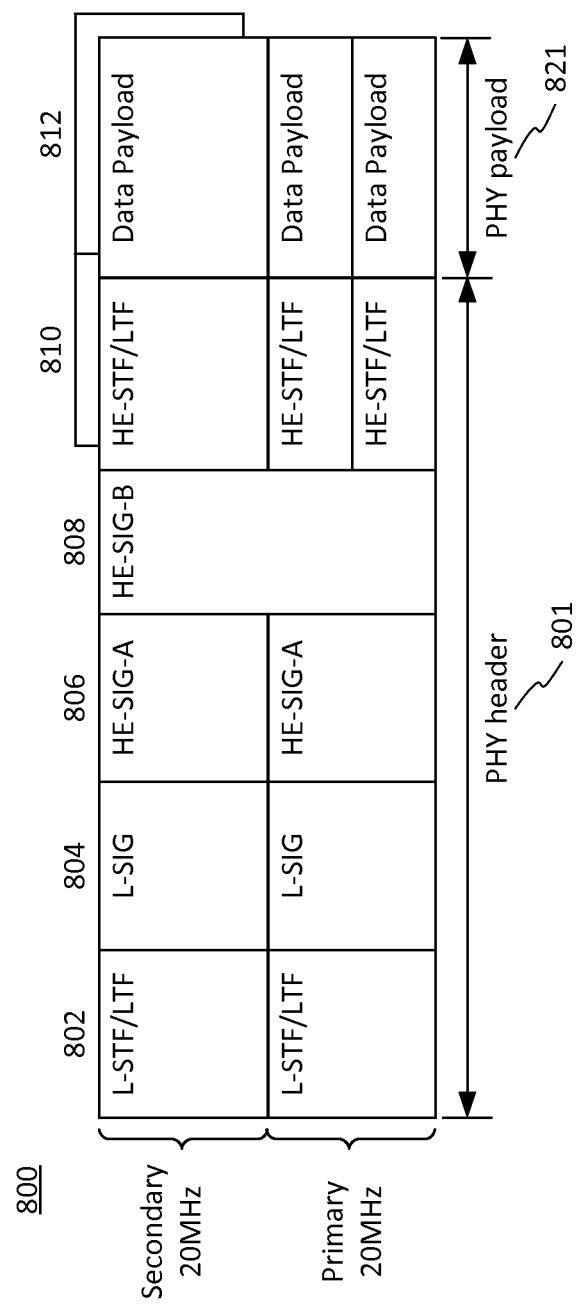
FIG. 8 presents a PHY frame having a PHY header with three (3) SIG fields, according to one implementation of the present disclosure.

FIG. 8 presents PHY frame 800 having PHY header 801 with three (3) SIG fields 804/806/808, according to one implementation of the present disclosure. As shown in FIG. 8, SIG fields include L-SIG 804, HE-SIG-A 806, and HE-SIG-B 808. In the implementation of FIG. 8, HE-SIG-A 806 includes an indication to a receiver whether or not HE-SIG-B 808 includes resource allocation information. As such, resource allocation information is included in HE-SIG-B 808 only when HE-SIG-A 806 indicates that HE-SIG-B 808 includes such information. As shown in FIG. 8, PHY header 801 also includes L-STF/L-LTF 802 and L-SIG 804, which are the same as L-STF 302, L-LTF 304, and L-SIG 306 in PHY header 301 of FIG. 3.

Unlike the implementation of FIG. 7A, PHY header 801 of FIG. 8 may not include a HE-TF-B field and, thus, there is less overhead in PHY header 801 compared to PHY header 701. In the implementation of FIG. 8, for proper decoding of HE-SIG-B 808 with a HE-TF-B field absent, the receiver buffers the entire channel bandwidth of the received L-LTF 802, and after identifying the bandwidth of the frame, the receiver reutilizes L-LTF 802 information for the whole occupied bandwidth for decoding HE-SIG-B 808.

In the implementation of FIG. 8, HE-SIG-A 806 may include information relating to proper channel deferral, and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 806 may also include an indication if HE-SIG-B 808 includes resource allocation information and may also indicate the size of HE-SIG-B 808.

HE-SIG-A 806 is encoded in a predetermined channel bandwidth, e.g. 20 MHz, and is duplicated at every predetermined channel bandwidth that the frame occupies. Also, channel estimation and decoding of HE-SIG-A 806 may rely on L-STF/L-LTF 802. HE-SIG-B 808 includes per-STA frame information, such as MCS level, coding scheme, and/or use of STBC. If HE-SIG-A 806 indicates that HE-SIG-B 808 includes resource allocation information, HE-SIG-B 808 will have resource allocation information for each scheduled STA, which may include mapping information between allocated sub-channel and corresponding STA. HE-SIG-B 808 may be encoded using an entire bandwidth that is indicated in HE-SIG-A 806 or may be encoded across multiple sub-bands of the channel in duplicated, non-duplicated, or partially duplicated parts as noted above. For proper decoding of HE-SIG-B 808, the receiver needs to buffer L-LTF 802 value for the entire channel bandwidth of the received frame, as discussed above.

In another implementation of FIG. 8, HE-SIG-A 806 includes an indication to a receiver whether HE-SIG-B 808 is included in PHY header 801 or not, where HE-SIG-B 808 includes resource allocation information. As such, resource allocation information is included only when HE-SIG-A 806 indicates that HE-SIG-B 808 is included. As shown in FIG. 8, PHY header 801 also includes L-STF/L-LTF 802 and L-SIG 804, which are the same as L-STF 302, L-LTF 304 and L-SIG 306 in PHY header 301 of FIG. 3.

In this implementation of FIG. 8, HE-SIG-A 806 may include information relating to proper channel deferral and overall frame format information, which may include channel bandwidth, basic service set (BSS) ID, group ID and/or partial AID/BSSID of target STAs, GI (Guard Interval), and frequency domain tone spacing in the event that there is more than one frequency domain tone spacing used in the frame. HE-SIG-A 806 may also include an indication if HE-SIG-B 808 is included in PHY header 801, and/or may also indicate the size of HE-SIG-B 808. In one implementation, HE-SIG-B 808 may have a variable size, and HE-SIG-A 806 may indicate a length of HE-SIG-B 808. For example, if HE-SIG-A 806 indicates that the length of HE-SIG-B 808 is zero, HE-SIG-B 808 is not included in PHY header 801. However, if HE-SIG-A 806 indicates that the length of HE-SIG-B 808 is a number other than zero, PHY header 801 will include HE-SIG-B 808 of the length indicated.

HE-SIG-A 806 may be encoded in a predetermined channel bandwidth, e.g. 20 MHz, and is duplicated at every predetermined channel bandwidth that the frame occupies. Also, channel estimation and decoding of HE-SIG-A 806 may rely on L-STF/L-LTF 802. HE-SIG-B 808 includes per-STA frame information, such as MCS level, coding scheme, and use of STBC. HE-SIG-B 808 may also have resource allocation information for each scheduled STA, which may include mapping information between allocated sub-channel and corresponding STA. HE-SIG-B 808 may be encoded using an entire bandwidth that is indicated in HE-SIG-A 806 or may be encoded across multiple sub-bands of the channel in duplicated, non-duplicated, or partially duplicated parts as noted above. For proper decoding of HE-SIG-B 808, the receiver needs to buffer L-LTF 802 value for the entire channel bandwidth of the received frame, as discussed above.

Figure 9:
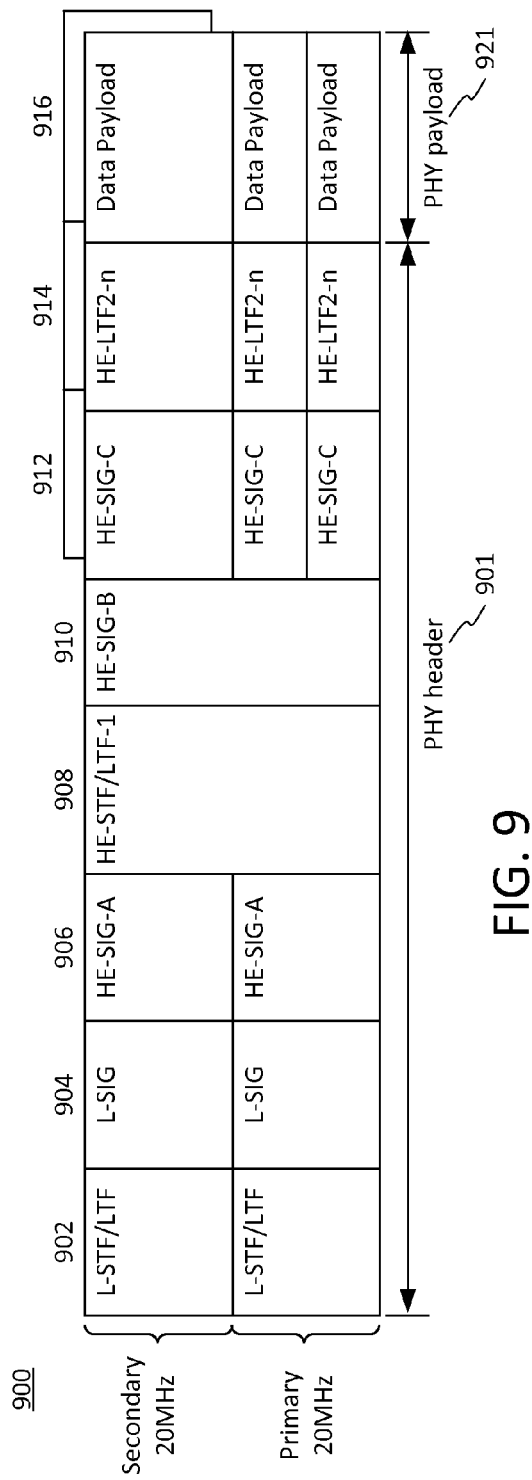
FIG. 9 presents a PHY frame having a PHY header with four (4) possible SIG fields and a common HE-STF/LTF1 field, according to one implementation of the present disclosure.

FIG. 9 presents PHY frame 900 having PHY header 901 with four (4) possible SIG fields 904/906/910/912 and common HE-STF/LTF1 908 field, according to one implementation of the present disclosure.

As shown in FIG. 9, SIG fields include L-SIG 904, HE-SIG-A 906, HE-SIG-B 910, and HE-SIG-C 912. In the implementation of FIG. 9, HE-SIG-A 906 includes an indication to a receiver whether HE-SIG-B 910 is included in PHY header 901 or not, where HE-SIG-B 910 includes resource allocation information. As such, HE-SIG-B 910 is included in PHY header 901 only when HE-SIG-A 906 indicates that HE-SIG-B 910 exists in PHY header 901. As shown in FIG. 9, PHY header 901 also includes L-STF/L-LTF 902 and L-SIG 904, which are the same as L-STF 302, L-LTF 304 and L-SIG 306 in PHY header 301 of FIG. 3. PHY header 901 also includes HE-STF/LTF1 908 for estimating the channel and decoding of HE-SIG-B 910, HE-SIG-C 912, and data payload 916 for each allocated user's stream. In case the data payload 916 is encoded with the number of space-time streams more than one, additional HE-LTF2 to HE-LTF2$n$ 914 would follow HE-SIG-C 912.

In the implementation of FIG. 9, HE-SIG-A 906 may include information relating to proper channel deferral and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 906 may also include an indication as to whether HE-SIG-B 910 exists in PHY header 901. In one implementation, HE-SIG-B 910 may have a variable size and HE-SIG-A 906 may indicate a length of HE-SIG-B 910. For example, if HE-SIG-A 906 indicates that the length of HE-SIG-B 910 is zero, HE-SIG-B 910 is not included in PHY header 901. However, if HE-SIG-A 906 indicates that the length of HE-SIG-B 910 is a number other than zero, PHY header 901 will include HE-SIG-B 910 of the length indicated. In another implementation, HE-SIG-B 910 may have a fixed length and a single bit in HE-SIG-A 906 may indicate whether or not PHY header 901 includes HE-SIG-B 910.

HE-SIG-A 906 is encoded in a predetermined channel bandwidth, e.g. 20 MHz, and is duplicated at every predetermined channel bandwidth that the frame occupies. Also, channel estimation and decoding of HE-SIG-A 906 may rely on L-STF/L-LTF 902. HE-SIG-B 910 has the resource allocation information for each scheduled STA, which may include mapping information between allocated sub-channel and corresponding STA. HE-SIG-B 910 may be encoded using an entire bandwidth that is indicated in HE-SIG-A 906 or may be encoded across multiple sub-bands of the channel in duplicated, non-duplicated, or partially duplicated parts as noted above.

HE-SIG-C 912 may include per-STA frame information, such as MCS level, coding scheme, and/or use of STBC. In one implementation, HE-SIG-C 912 may be encoded per each allocated sub-channel and utilizes HE-STF/LTF1 908 for channel estimation and decoding.

For proper decoding of HE-SIG-B 910, HE-SIG-C 912 and data payload, HE-STF/LTF1 908 is included in PHY header 901 before HE-SIG-B 910. In case the data payload is encoded with the number of space-time streams more than one, additional HE-LTF2 to HE-LTF2-*n* 914 would follow HE-SIG-C 912. In case data payload of different users is encoded with different number of space-time streams, the number of HE-LTF2 914 fields for each different sub-channel can be different depending on the actual number of space-time streams allocated in each sub-channel. If frequency domain tone spacing of data payload is different from that of legacy fields, for example legacy field is using 64 FFT in 20 MHz bandwidth (i.e., a DFT period of 3.2 µs and subcarrier spacing of 312.5 kHz) and data payload is using 256 FFT in 20 MHz bandwidth (i.e., a DFT period of 12.8 µs and subcarrier spacing of 78.125 kHz), frequency domain tone spacing of data payload is applied from HE-STF/LTF1 908 through the end of the frame.

Figure 10:
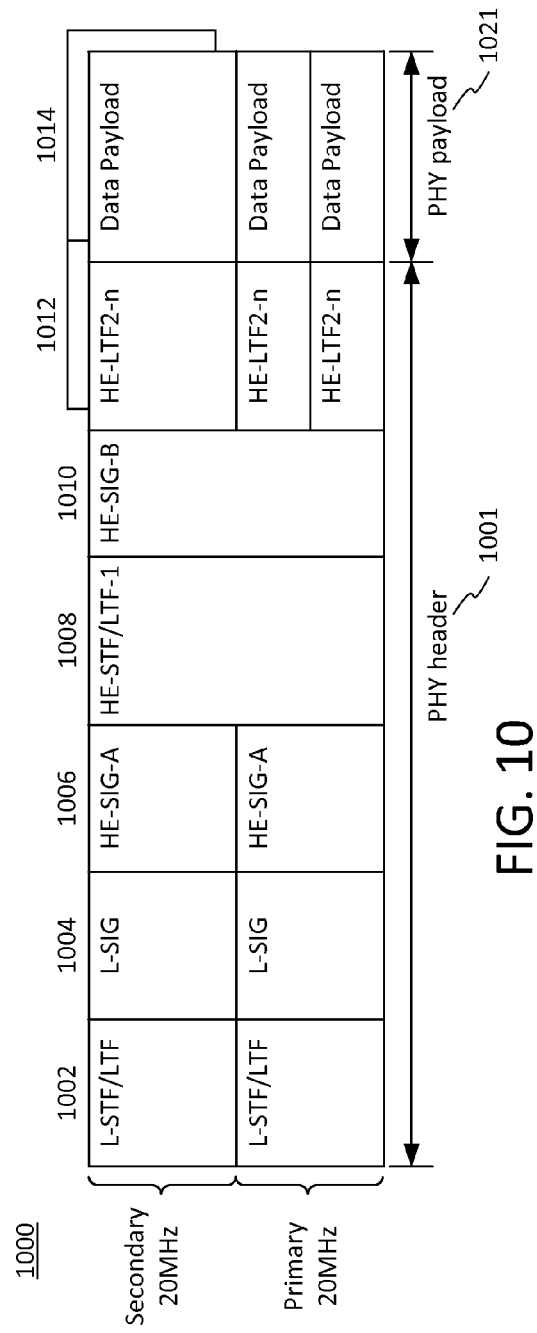
FIG. 10 presents a PHY frame having a PHY header with three (3) SIG fields and a common HE-STF/LTF1 field, according to one implementation of the present disclosure.

FIG. 10 presents PHY frame 1000 having PHY header 1001 with three (3) SIG fields 1004/1006/1010 and common HE-STF/LTF1 1008 field, according to one implementation of the present disclosure. As shown in FIG. 10, SIG fields include L-SIG 1004, HE-SIG-A 1006 and HE-SIG-B 1010. In the implementation of FIG. 10, HE-SIG-A 1006 includes an indication to a receiver whether or not HE-SIG-B 1010 includes resource allocation information. As such, resource allocation information is included in HE-SIG-B 1010 only when HE-SIG-A 1006 indicates that HE-SIG-B 1010 includes such information. As shown in FIG. 10, PHY header 1001 also includes L-STF/L-LTF 1002 and L-SIG 1004, which are the same as L-STF 302, L-LTF 304 and L-SIG 306 in PHY header 301 of FIG. 3. PHY header 1001 also includes HE-STF/LTF1 1008 for estimating channel and decoding of HE-SIG-B 1010 and data payload for each allocated user's stream. In case the data payload is encoded with a number of space-time streams more than one, additional HE-LTF2 to HE-LTF2-*n* fields 1012 would follow HE-SIG-B 1010.

In the implementation of FIG. 10, HE-SIG-A 1006 may include information relating to proper channel deferral and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 1006 may also include an indication if HE-SIG-B 1010 includes resource allocation information, and may also indicate the size of HE-SIG-B 1010.

HE-SIG-A 1006 is encoded in a predetermined channel bandwidth, e.g. 20 MHz and is duplicated at every predetermined channel bandwidth that the frame occupies. Also, channel estimation and decoding of HE-SIG-A 1006 may rely on L-STF/L-LTF 1002. HE-SIG-B 1010 may include per-STA frame information, such as MCS level, coding scheme, and/or use of STBC. If HE-SIG-A 1006 indicates that HE-SIG-B 1010 includes resource allocation information, HE-SIG-B 1010 field will have resource allocation information for each scheduled STA, which may include mapping information between allocated sub-channel and corresponding STA. HE-SIG-B 1010 may be encoded using an entire bandwidth that is indicated in HE-SIG-A 1006 or may be encoded across multiple sub-bands of the channel in duplicated, non-duplicated, or partially duplicated parts as noted above.

For proper decoding of HE-SIG-B 1010 and data payload, HE-STF/LTF1 1008 is included in PHY header 1001 before HE-SIG-B 1010. In case the data payload is encoded with the number of space-time streams more than one, additional HE-LTF2 to HE-LTF2-*n* 1012 would follow HE-SIG-B 1010. If frequency domain tone spacing of data payload is different from that of legacy fields, for example legacy field is using 64 FFT in 20 MHz bandwidth (i.e., a DFT period of 3.2 µs and subcarrier spacing of 312.5 kHz) and data payload is using 256 FFT in 20 MHz bandwidth (i.e., a DFT period of 12.8 µs and subcarrier spacing of 78.125 kHz), frequency domain tone spacing of data payload is applied from HE-STF/LTF1 1008 through the end of the frame.

In another implementation that is shown in FIG. 10, HE-SIG-A 1006 may include an indication to a receiver whether HE-SIG-B 1010 is included in PHY header 1001 or not, where HE-SIG-B 1010 includes resource allocation information. As such, resource allocation information is included in HE-SIG-B 1010 only when HE-SIG-A 1006 indicates that HE-SIG-B 1010 is included in PHY header 1001. As shown in FIG. 10, PHY header 1001 also includes L-STF/L-LTF 1002 and L-SIG 1004, which are the same as L-STF 302, L-LTF 304 and L-SIG 306 in PHY header 301 of FIG. 3. PHY header 1001 also includes HE-STF/LTF1 1008 for estimating channel and decoding of HE-SIG-B 1010 and data payload for each allocated user's stream. In case the data payload is encoded with a number of space-time streams more than one, additional HE-LTF2 to HE-LTF2-*n* fields 1012 would follow HE-SIG-B 1010.

In this implementation of FIG. 10, HE-SIG-A 1006 may include information relating to proper channel deferral, and overall frame format information, which may include channel bandwidth, basic service set (BSS) ID, BSS Color, group ID and/or partial AID/BSSID of target STAs, GI (Guard Interval), and frequency domain tone spacing in the event that there is more than one frequency domain tone spacing used in the frame. HE-SIG-A 1006 may also include an indication as to whether HE-SIG-B 1010 exists in PHY header 1001. In one implementation, HE-SIG-B 1010 may have a variable size, and HE-SIG-A 1006 may indicate a length of HE-SIG-B 1010. For example, if HE-SIG-A 1006 indicates that the length of HE-SIG-B 1010 is zero, PHY header 1001 will not include HE-SIG-B 1010. However, if HE-SIG-A 1006 indicates that the length of HE-SIG-B 1010 is a number other than zero, PHY header 1001 will include HE-SIG-B 1010 of the length indicated.

HE-SIG-A 1006 may be encoded in a predetermined channel bandwidth, e.g. 20 MHz, and may be duplicated at every predetermined channel bandwidth that the frame occupies. Also, channel estimation and decoding of HE-SIG-A 1006 may rely on L-STF/L-LTF 1002. HE-SIG-B 1010 may include per-STA frame information, such as MCS level, coding scheme, and/or use of STBC. HE-SIG-B 1010 field may also have resource allocation information for each scheduled STA, which may include mapping information between allocated sub-channel and corresponding STA. HE-SIG-B 1010 may be encoded using an entire bandwidth that is indicated in HE-SIG-A 1006 or may be encoded across multiple sub-bands of the channel in duplicated, non-duplicated, or partially duplicated parts as noted above.

For proper decoding of HE-SIG-B 1010 and data payload, HE-STF/LTF1 1008 may be included in PHY header 1001 before HE-SIG-B 1010. In case the data payload is encoded with the number of space-time streams more than one, additional HE-LTF2 to HE-LTF2-*n* 1012 would follow HE-SIG-B 1010. If frequency domain tone spacing of data payload is different from that of legacy fields, for example legacy field is using 64 FFT in 20 MHz bandwidth (i.e., a DFT period of 3.2 μs and subcarrier spacing of 312.5 kHz) and data payload is using 256 FFT in 20 MHz bandwidth (i.e., a DFT period of 12.8 μs and subcarrier spacing of 78.125 kHz), frequency domain tone spacing of data payload is applied from HE-STF/LTF1 1008 through the end of the frame.

Figure 11:
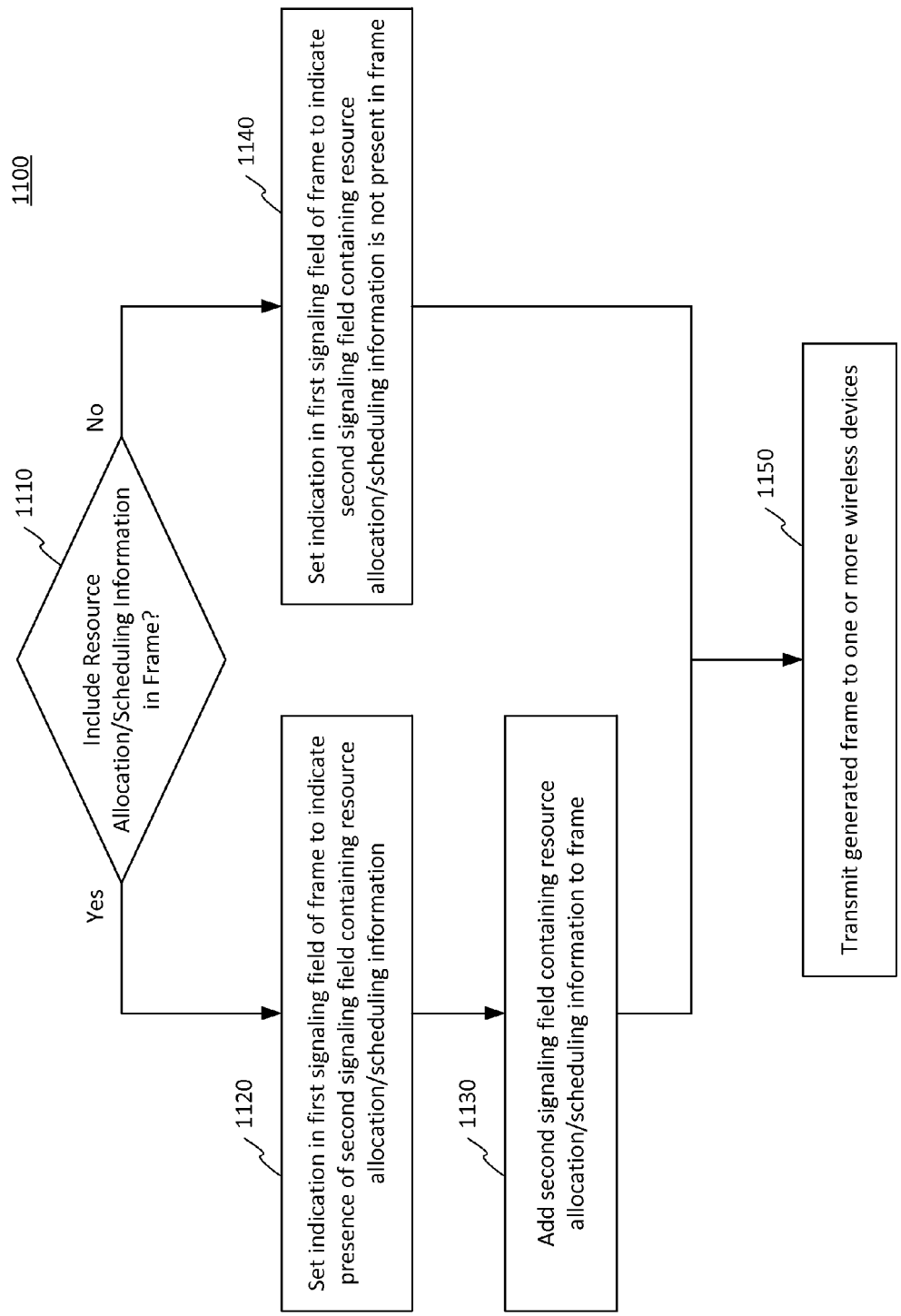
FIG. 11 presents a flow diagram of a method for use by a station of FIG. 1, according to one implementation of the present disclosure.

FIG. 11 presents a flow diagram of method 1100 for use by a wireless device in WLAN 110 of FIG. 1, according to one implementation of the present disclosure. For example, method 1100 may be performed by AP 102 or STA 104. Method 1100 will be described below in relation to AP 102 for simplicity, but it is understood that method 1100 may be similarly performed by another wireless device in WLAN 110.

As discussed above and shown in FIG. 2, AP 102 may include baseband processor 202 and memory 240, which may be used to perform one or more of the operations of method 1100. In one embodiment, method 1100 may commence at operation 1110. At operation 1110, AP 102 may determine whether resource allocation/scheduling information should or needs to be included in a generated frame that will be transmitted to one or more recipients by AP 102. In one embodiment, AP 102 may determine at operation 1110 that the resource allocation/scheduling information is unnecessary for the generated frame when the generated frame is intended to be sent to a single recipient in a full-band transmission (e.g., a single user (SU) full band transmission). In this case of a single recipient/user full band transmission, resource allocation/scheduling information provided would be unnecessary as the channel will not be divided into separate sub-channel/resource units. When method 1100 will be performed by STA 104, the resource allocation/scheduling information may be unnecessary when the generated frame will be transmitted as a response to a trigger frame. In the case of a response to a trigger frame, resource allocation/scheduling information does not need to be retransmitted back to the sender of the trigger frame as the trigger frame included this information. Accordingly, the recipient of the generated frame would already be aware of this reallocation information. Conversely, resource allocation/scheduling information may be necessary when the generated frame is a downlink multi-user transmission (e.g., an OFDMA transmission from AP 102 to two or more STAs 104/106/108). In this situation, each STA needs to know sub-channel assignment to analyze the generated frame, which would be provided in resource allocation/scheduling information.

In response to determining that the resource allocation/scheduling information is needed in the generated frame, operation 1120 may set an indication in a first signaling field of the generated frame that a second signaling field containing the resource allocation/scheduling information is present in the generated frame. In one implementation, this indication may be a single bit that indicates the presence of the second signaling field, while in other implementations the indication may be a series of bits that indicates a length of the second signaling field. For example, in the latter case, the first signaling field may record a length of zero when the second signaling field is not present and a length greater than zero when the second signaling field is present.

In some embodiments, the generated frame may be similar or identical to one or more of frames 500/600/700/750/800/900/1000 described above and may include a header similar to one or more of headers 501/601/701/751/801/901/1001. For example, the first signaling field may be HE-SIG-A while the second signaling field is HE-SIG-B.

Following setting the indication of the presence of the second signaling field and corresponding presence of resource allocation/scheduling information, operation 1130 may add the second signaling field to the frame. As noted above, the second signaling field may include resource allocation/scheduling information, including mapping of STAs to particular sub-bands of a channel.

Returning to operation 1110, upon determining that resource allocation/scheduling information is not needed in the frame, operation 1130 may reflect this decision in the first signaling field. As noted above, when method 1100 is being performed by STA 104 and the generated frame is a response to a trigger frame, the frame may not require resource allocation/scheduling information. In particular, since the trigger frame already included resource allocation/scheduling information, the generated frame does not need to convey this information to the original sender (e.g., AP 102).

Although described in relation to first and second signaling fields, the generated frame may include one or more additional fields, such as L-STF/LTF 502/602/702/752/802/902/1002 and L-SIG 504/604/704/754/804/904/1004, HE-STF/LTF 512/610/712/758/810/914/1012 and HE-SIG-C 514/612/912, and also data payload 522/614/714/760/812/916/1014. Following generation of the generated frame, AP 102 may transmit the generated frame at operation 1140 to one or more wireless devices (e.g., STAs 104/106/108).

Figure 12:
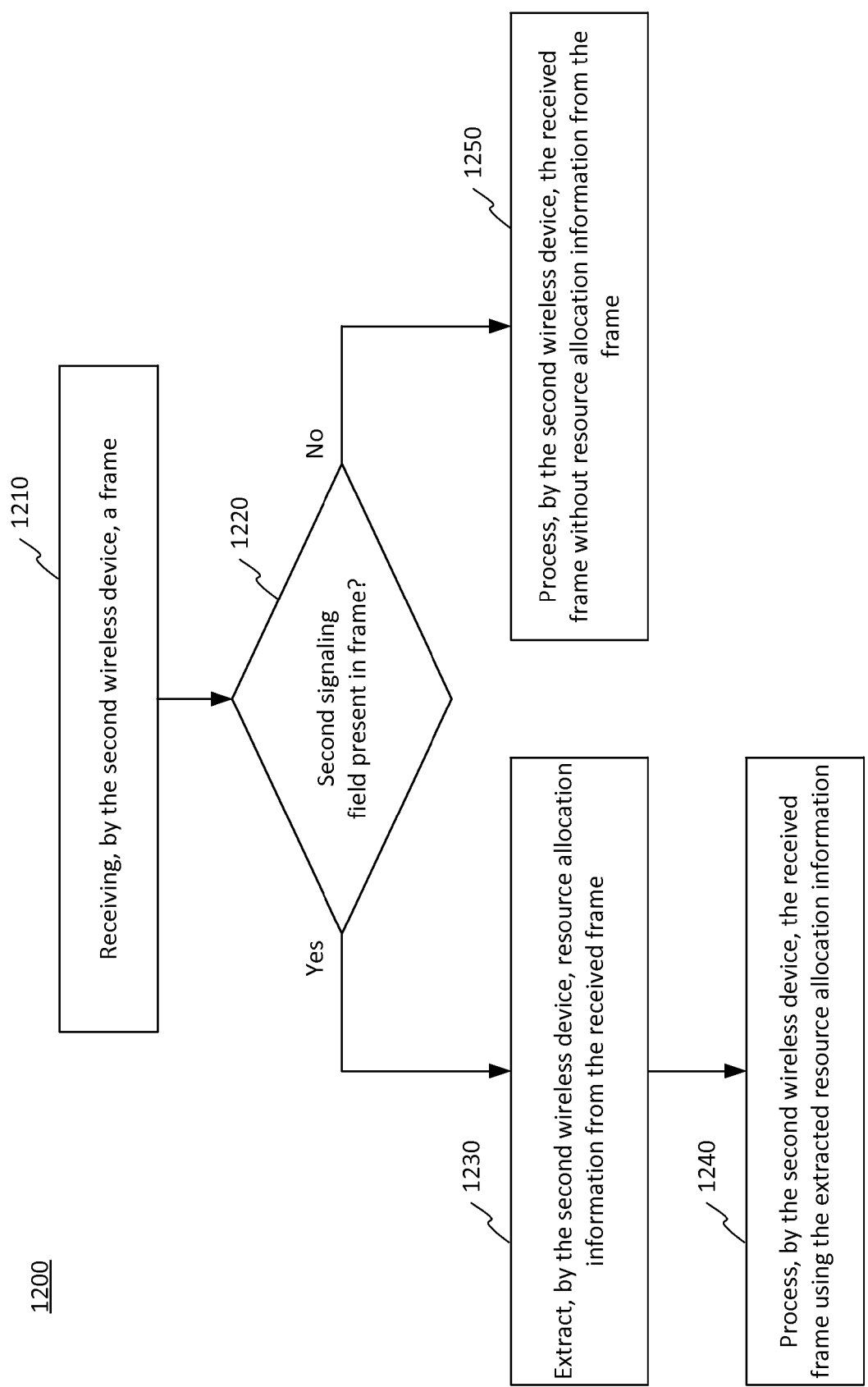
FIG. 12 presents a flow diagram of a method for use by a station of FIG. 1, according to one implementation of the present disclosure.

Turning now to FIG. 12, method 1200 will be described. Method 1200 may be performed by a wireless device operating in WLAN 110 shown in FIG. 1. For example, method 1200 may be performed by AP 102 or STA 104. As described herein, method 1200 will be performed by STA 104 for simplicity of description. As discussed above and shown in FIG. 2, STA 104 may include baseband processor 202 and memory 240, which may be used to perform one or more of the operations of method 1200.

Method 1200 may commence at operation 1210 with STA 104 receiving a frame, which may have been generated by AP 102 using method 1100. The frame may include a first signaling field and optionally a second signaling field, which contains resource allocation information for multiple user transmissions. In some embodiments, the received frame may also be received simultaneously by multiple other STAs (e.g., STA 106 and 108).

At operation 1220, STA 104 may process the received frame. Processing the frame may include analyzing a first signaling field of the first frame to determine the presence of a second signaling field. As described above in relation to method 1100, the first signaling field may include an indication as to whether a second signaling field containing resource allocation information is present in the received frame. This indication may be a single bit or a set of bits, which may be used to indicate the length of the second signaling field.

Upon determining that the second signaling field is present and/or includes resource allocation information, STA 104 may extract resource allocation information from the second signaling field of the received frame at operation 1230. STA 104 may thereafter utilize the extracted information to process the frame at operation 1240. For example, STA 104 may determine a sub-band/sub-channel in the frame that is devoted/assigned/mapped to STA 104 based on the extracted resource allocation information from the frame. For example, the resource allocation information may indicate that a 20 MHz channel, upon which the received frame was transmitted, has been divided into two sub-channels/sub-bands: a first sub-channel/sub-band mapped to STA 104 and a second sub-channel/sub-band mapped to STA 106. In this example, STA 104 may analyze the resource scheduling information and determine that the first sub-channel/sub-band is mapped to STA 104. Based on this, STA 104 may process a data payload of the frame transmitted within the first sub-channel/sub-band.

Alternatively, upon determining that the second signaling field is not present and/or the received frame does not include resource allocation information, STA 104 may process the frame using previously known resource allocation information at operation 1250 or otherwise without resource allocation information from the received frame (e.g., process the frame a single user, full band transmission).

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

As noted above, an embodiment of the invention may be an apparatus (e.g., an access point, a client station, or another network or computing device) that includes one or more hardware and software logic structure for performing one or more of the operations described herein. For example, the apparatus may include a memory unit, which stores instructions that may be executed by a hardware processor installed in the apparatus. The apparatus may also include one or more other hardware or software elements, including a network interface, a display device, etc.

As also noted above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

What is claimed is:

1. A method for performing wireless communications, the method comprising:
   receiving, by a wireless device, a trigger frame that coordinates an uplink multiuser transmission;
   generating, by the wireless device, an uplink frame, wherein generating the uplink frame includes:
      providing, in the uplink frame, a High Efficiency Signal A (HE-SIG-A) field including frame format information for the uplink frame, and
      providing, in the uplink frame, a High Efficiency Short Training Field (HE-STF) immediately after the HE-SIG-A field in response to receiving the trigger frame; and
   transmitting, by the wireless device as an immediate response to the trigger frame, the uplink frame over a wireless channel.

2. The method of claim 1, wherein generating the uplink frame further includes:
   providing a High Efficiency Long Training Field (HE-LTF) immediately after the HE-STF.

3. The method of claim 1, wherein the wireless channel includes a plurality of resource units assigned to one or more wireless devices, and wherein generating the uplink frame further includes:
   providing the HE-SIG-A field in each 20 MHz channel of the wireless channel, and
   providing the HE-STF and the HE-LTF in each assigned resource unit of the wireless channel.

4. The method of claim 3, wherein the trigger frame includes resource allocation information, and wherein the wireless device transmits the uplink frame using a resource unit assigned to the wireless device in the trigger frame.

5. The method of claim 1, wherein generating the uplink frame includes:
   providing, using the HE-SIG-A field, an indication that an HE-SIG-B field is not present in the uplink frame.

6. The method of claim 5, wherein the HE-SIG-A field includes a length sub-field that indicates a length of the HE-SIG-B field.

7. The method of claim 6, further comprising:
   setting the length sub-field to zero in response to receiving the trigger frame.

8. The method of claim 5, wherein the HE-SIG-B field includes scheduling information for processing a corresponding frame by a receiving device.

9. The method of claim 8, wherein the scheduling information includes a mapping of resource units to stations.

10. The method of claim 1, wherein the frame format information includes channel bandwidth information and basic service set (BSS) Color or information on a BSS identification for the wireless device.

11. The method of claim 1, wherein the uplink frame is one or more of a Multi-User Up-Link Orthogonal Frequency Division Multiple Access (MU UL OFDMA) frame and a Multi-User Up-Link Multi-User Multiple Input Multiple Output (MU UL MIMO) frame.

12. A method for performing wireless communications in a wireless network, the method comprising:
  generating, by a wireless device, a frame, wherein generating the frame includes:
    determining that the frame is intended for a single recipient station;
    providing, in the frame, a High Efficiency Signal A (HE-SIG-A) field including frame format information for the frame,
    providing, in the frame, an address of the single recipient station in the wireless network, and
    providing, in the frame, a High Efficiency Short Training Field (HE-STF) immediately after the HE-SIG-A field in response to determining that the frame is intended for the single recipient station; and
  transmitting, by the wireless device, the frame over a wireless channel to the single recipient station.

13. The method of claim 12, wherein generating the frame further includes:
  providing a High Efficiency Long Training Field (HE-LTF) immediately after the HE-STF.

14. The method of claim 12, wherein generating the frame further includes:
  providing the HE-SIG-A field in each 20 MHz channel of the wireless channel, and
  providing the HE-STF and the HE-LTF across an entire bandwidth of the wireless channel.

15. The method of claim 12, wherein generating the frame includes:
  providing, using the HE-SIG-A field, an indication that the HE-SIG-B field is not present in the frame.

16. The method of claim 15, wherein the HE-SIG-A field includes a length sub-field that indicates a length of the HE-SIG-B field.

17. The method of claim 12, wherein the frame format information includes channel bandwidth information, cyclic prefix, and basic service set (BSS) Color or information on a BSS identification for the wireless device.

18. A wireless device for performing wireless communications in a wireless network, the wireless device comprising:
  one or more memories; and
  one or more processors coupled to the one or more memories, the one or more processors configured to
  generate a frame for transmission, wherein generating the frame includes:
    determining that the frame is intended for a single recipient station;
    providing, in the frame, a High Efficiency Signal A (HE-SIG-A) field including frame format information for the frame,
    providing, in the frame, an address of the single recipient station in the wireless network, and
    providing, in the frame, a High Efficiency Short Training Field (HE-STF) immediately after the HE-SIG-A field in response to determining that the frame is intended for the single recipient station; and
  transmitting, by the wireless device, the frame over a wireless channel to the single recipient station.

19. The wireless device of claim 17, wherein generating the frame includes:
  providing, using the HE-SIG-A field, an indication that the HE-SIG-B field is not present in the frame.

20. The wireless device of claim 19, wherein the HE-SIG-A field includes a length sub-field that indicates a length of the HE-SIG-B field.

* * * * *